United States Patent
Hinchey et al.

(10) Patent No.: US 7,543,274 B2
(45) Date of Patent: Jun. 2, 2009

(54) SYSTEM AND METHOD FOR DERIVING A PROCESS-BASED SPECIFICATION

(75) Inventors: Michael Gerard Hinchey, Bowie, MD (US); James Larry Rash, Davidsonville, MD (US); Christopher A. Rouff, Beltsville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 552 days.

(21) Appl. No.: 10/789,028

(22) Filed: Feb. 25, 2004

(65) Prior Publication Data

US 2005/0138602 A1 Jun. 23, 2005

Related U.S. Application Data

(60) Provisional application No. 60/533,376, filed on Dec. 22, 2003.

(51) Int. Cl.
*G06F 9/44* (2006.01)
(52) U.S. Cl. .................................................... 717/123
(58) Field of Classification Search ......... 717/100–109, 717/169–170, 123
See application file for complete search history.

(56) References Cited

U.S. PATENT DOCUMENTS

| | | | |
|---|---|---|---|
| 5,163,016 A | 11/1992 | Har'El et al. | |
| 5,353,371 A | 10/1994 | Honiden et al. | |
| 5,495,567 A * | 2/1996 | Iizawa et al. | 715/762 |
| 5,535,322 A * | 7/1996 | Hecht | 705/1 |
| 5,623,499 A | 4/1997 | Ko et al. | |
| 5,799,193 A | 8/1998 | Sherman et al. | |
| 6,275,976 B1 | 8/2001 | Scandura | |
| 6,289,502 B1 | 9/2001 | Garland et al. | |
| 6,314,555 B1 | 11/2001 | Ndumu et al. | |
| 6,343,372 B1 | 1/2002 | Felty et al. | |
| 6,353,896 B1 | 3/2002 | Holzmann et al. | |
| 6,405,364 B1 * | 6/2002 | Bowman-Amuah | 717/101 |
| 6,662,357 B1 * | 12/2003 | Bowman-Amuah | 717/120 |
| 6,804,686 B1 * | 10/2004 | Stone et al. | 707/104.1 |
| 6,907,546 B1 * | 6/2005 | Haswell et al. | 714/38 |

(Continued)

OTHER PUBLICATIONS

C.J. Fidge, "A Formal Definition of Prority in CSP", Sep. 1993, ACM Press vol. 15 Issue 4, pp. 681-705.*

(Continued)

*Primary Examiner*—Wei Y Zhen
*Assistant Examiner*—Anna Deng
(74) *Attorney, Agent, or Firm*—Heather Goo

(57) ABSTRACT

A system and method for deriving a process-based specification for a system is disclosed. The process-based specification is mathematically inferred from a trace-based specification. The trace-based specification is derived from a non-empty set of traces or natural language scenarios. The process-based specification is mathematically equivalent to the trace-based specification. Code is generated, if applicable, from the process-based specification. A process, or phases of a process, using the features disclosed can be reversed and repeated to allow for an interactive development and modification of legacy systems. The process is applicable to any class of system, including, but not limited to, biological and physical systems, electrical and electro-mechanical systems in addition to software, hardware and hybrid hardware-software systems.

26 Claims, 2 Drawing Sheets

U.S. PATENT DOCUMENTS

| | | | | |
|---|---|---|---|---|
| 7,047,518 | B2 * | 5/2006 | Little et al. | 717/108 |
| 7,051,317 | B2 * | 5/2006 | Vazquez et al. | 717/104 |
| 7,086,009 | B2 * | 8/2006 | Resnick et al. | 715/771 |
| 7,114,149 | B2 * | 9/2006 | Aptus et al. | 717/123 |
| 7,472,374 | B1 * | 12/2008 | Dillman et al. | 717/102 |
| 2001/0052108 | A1 * | 12/2001 | Bowman-Amuah | 717/1 |
| 2002/0029231 | A1 * | 3/2002 | Aptus et al. | 707/513 |
| 2002/0032900 | A1 * | 3/2002 | Charisius et al. | 717/2 |
| 2002/0091990 | A1 * | 7/2002 | Little et al. | 717/105 |
| 2002/0100015 | A1 | 7/2002 | Harel et al. | |
| 2002/0104071 | A1 * | 8/2002 | Charisius et al. | 717/109 |
| 2002/0116702 | A1 * | 8/2002 | Aptus et al. | 717/170 |
| 2003/0067481 | A1 * | 4/2003 | Chedgey et al. | 345/738 |
| 2005/0022155 | A1 * | 1/2005 | Broberg et al. | 717/101 |
| 2005/0193269 | A1 * | 9/2005 | Haswell et al. | 714/38 |

OTHER PUBLICATIONS

Mattew Hennessy, et al. "Algebraic Laws for Nondeterminism andconcurrency", Jan. 1985, ACM Press, Journal of the ACM (JACM), vol. 32 Issue 1, pp. 137-161.*

B-Core Limited., "The B-Toolkit", pp. 1-9, 02/22.

Michael Butler, "csp2B: A Practical Approach To Combining CSP and B"; Declarative Systems and Software Engineering Group, Technical Report DSSE-TR-99-2, Department of Electronics and Computer Science, University of Southampton, Feb. 1999, pp. 1-16, Highfield, Southampton SO17 1BJ, United Kingdom.

* cited by examiner

SYSTEM AND METHOD FOR DERIVING A PROCESS-BASED SPECIFICATION

This application for patent hereby claims priority to U.S. Provisional Patent Application Ser. No. 60/533,376 entitled "System and Method for deriving a Process-Based Specification" by Hinchey et al., which was filed on Dec. 22, 2003. This provisional patent application is hereby incorporated by reference.

ORIGIN OF THE INVENTION

The invention described herein was made by employees of the United States Government, and may be implemented or manufactured and used by or for the Government for governmental purposes without the payment of any royalties thereon or therefor.

FIELD OF THE INVENTION

The present invention relates to computer and software engineering environments, and more particularly, the present invention relates to software development, requirements definition, formal methods, system validation and verification, and code generation, both automatic and manual. Additionally, the herein disclosed invention relates to the fields of chemical or biological process design or mechanical system design, and, generally to any field where the behaviors exhibited by a process to be designed is described by means of a set of scenarios expressed in natural language, or some appropriate graphical notation.

BACKGROUND OF THE INVENTION

Complex (software and hardware) systems are developed for numerous applications and processes, including the automated control of spacecraft operations and ground systems. Complex software and hardware systems, however, may encounter problems. The cause of potential faults and defects, such as redundancies, deadlocks, and omissions, may be difficult to determine, especially when the system is distributed and has parallel execution paths. Formal specification methods provide a means for avoiding or discovering such defects. Currently available techniques to formally specify software and hardware, however, can be difficult and time consuming to use.

Conventional processes for (hardware and software) system development include code generation (either automated or manual) from a specification that includes a specification language along with a tool kit. These processes enable model checking, verification, and automatic code generation. Disadvantages with these approaches include the user specifying every low-level detail of the system in advance. Thus, a system specification might be difficult to develop, understand, and modify. Further, difficulties may exist in establishing that the resulting code represents the customer's requirements, because the requirements are in natural language, and not in a specification language that is amenable to analysis.

Other conventional approaches include state-based approaches, employing, for example, statecharts or use-cases. These approaches may not offer the capability to check for errors, deadlocks, omissions, and the like, which formal specification languages provide, unless additional constraints are added. These constraints can be unwieldy or introduce inefficiencies into the development process, or indeed result in the incorrect system being developed. The same difficulties described above (i.e., the difficulty of establishing that the resulting code represents the customer's requirements) also apply to these other conventional approaches.

SUMMARY OF THE INVENTION

Accordingly, the disclosed embodiments of the present invention are directed toward system and methods for deriving a process-based specification that solves or reduces the problems within the conventional art. According to the disclosed embodiments of the present invention, a method for deriving a process-based specification for a system is disclosed. The method includes deriving a trace-based specification from a non-empty set of traces. The method includes mathematically inferring that the process-based specification is mathematically equivalent to the trace-based specification. Accordingly, the disclosed embodiments of the present invention are directed toward said methods for deriving a process-based specification that solves or reduces the problems within the conventional art.

Additional features or advantages of the disclosed embodiments are set forth in the description that follows, and in part will be implied from the description, or may be learned by practice of the invention. The objectives and other advantages of the invention are realized and obtained by the structure and methods particularly pointed out in the written description and the claims as well as the appended drawings.

BRIEF DESCRIPTION OF THE DRAWINGS

The accompanying drawings, which are included to provide further understanding of the disclosed invention, illustrate embodiments of the invention, and together with the descriptions serve to explain the principles of the invention. In the drawings.

DETAILED DESCRIPTION OF THE PREFERRED EMBODIMENTS

Aspects of the invention are disclosed in the accompanying description. Alternate embodiments of the present invention may be derived without parting from the spirit or scope of the present invention. It should be noted that like elements in the figures are indicated by like reference numbers.

Figure 1:
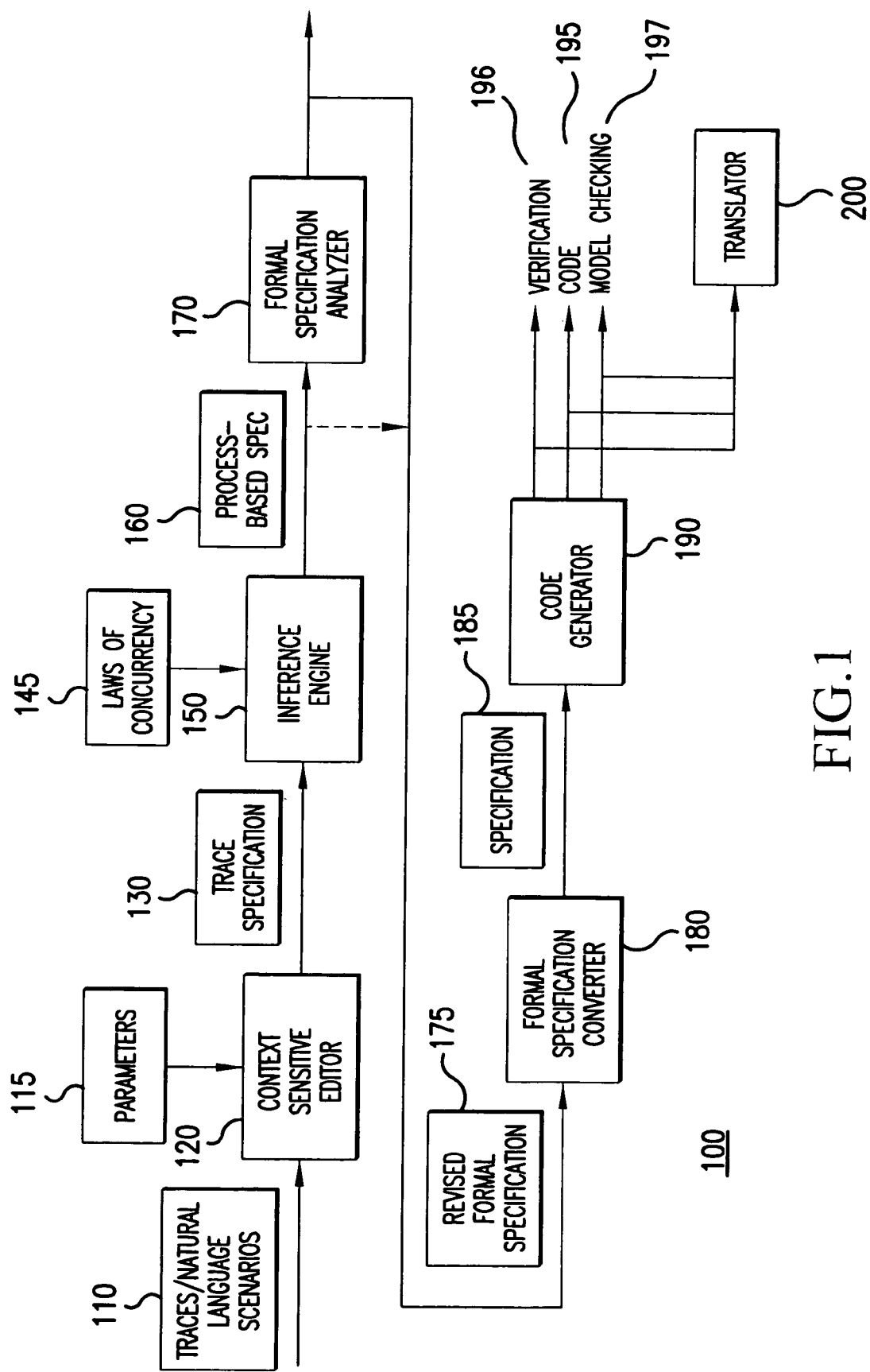
FIG. 1 illustrates a software development system according to the disclosed embodiments.

FIG. 1 illustrates a software development system 100 according to the disclosed embodiments. Software development system 100 includes a data flow and processing points for the data. Software development system 100 is representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. According to the disclosed embodiments, software development system 100 mechanically converts different types of specifications (either natural language scenarios or descriptions, or trace specifications, which are effectively pre-processed scenarios) into process-based formal specifications on which model checking and other mathematics-based verifications are performed, and then optionally converts the formal specification into code.

Software development system 100 receives natural language scenarios 110. A scenario is natural language text that describes the software's actions in response to incoming data and the internal goals of the software. Scenarios also may describe communication protocols between systems and between the components within the systems. Scenarios also may be known as use-cases. A scenario describes one or more potential executions of a system, describing what happens in a particular situation, and what range of behaviors is expected from or omitted by the system under various conditions.

The set of natural language scenarios 110 is constructed in terms of individual scenarios written in a structured natural language. Different scenarios may be written by different stakeholders of the system, corresponding to the different views they have of how the system will perform. Natural language scenarios 110 may be generated by a user with or without mechanical or computer aid. The set of natural language scenarios 110 provides the descriptions of actions that occur as the software executes. Some of these actions will be explicit and required, while others may be due to errors arising, or as a result of adapting to changing conditions as the system executes.

For example, if the system involves commanding space satellites, scenarios for that system may include sending commands to the satellites and processing data received in response to the commands. Natural language scenarios 110 should be specific to the technology or application domain to which it is applied. A fully automated general purpose approach covering all domains is technically prohibitive to implement in a way that is both complete and consistent. To ensure consistency, the domain of application must be specific-purpose. For example, scenarios for satellite systems may not be applicable as scenarios for systems that manufacture agricultural chemicals.

Natural language scenarios 110 are input to a context sensitive editor 120. Context sensitive editor 120 also has access to a database of domain parameters 115. Domain parameters reside in a database of parameters 115 that describes the terms usable and allowable in natural language scenarios 110, that is, the "context". The parameters allow for a wide range of domains and applications to be used with specialized terms in the scenarios. Different vocabulary applies to different areas of technology, and the vocabulary may change for different applications and different domains. Database of domain parameters 115 may comprise any terms or language that may be defined using grammar. Database of parameters 115 also will contain a dictionary of application-related events and actions.

Context sensitive editor 120 takes natural language scenarios 110 and database of domain parameters 115, and produces a trace specification 130 based on the inputted scenarios. Trace specification 130 correlates to natural language scenarios 110. In formal methods, and other areas of software engineering, a trace is a sequence of events that a process has engaged in up to a given point in time. The set of all possible behavior patterns of a process is represented by the set of traces of that process. Context sensitive editor 120 produces trace specification 130 from natural language scenarios 110. Context sensitive editor 120 may perform these actions automatically.

Trace specification 130 includes traces that are a list of all possible orderings of actions as described by the developers that are taking place within the scenarios. More specifically, traces are lists of computational actions. Traces list the actions in a sequential manner. In other words, the traces of trace specification 130 may not include conditional statements or actions. Conditions in the input scenarios 110 are maintained in the set of traces 130 by introducing multiple traces describing alternate execution patterns. As a result, the number of traces in the set of traces 130 is likely to exceed the number of scenarios in the set of natural language scenarios 110. Traces also may be known as sequences, events, or event-traces.

Traces also may be known as a sequence of steps. Trace specification, or set of traces, 130 incorporates a mathematical language that is behavioral. The set of traces 130 describes all possible behavior patterns of the system as described by the developers and/or users in the natural language scenarios 110. From this behavioral description, the disclosed embodiments can mathematically infer a more general description from specific descriptions. Specific execution paths within natural language scenarios 110 may be input, and generalized executions generated from the specific executions. The more generalized description is amenable to analysis and enables the highlighting of erroneous or problematic execution paths.

Inference Engine 150 is a theorem prover, also known as an automatice theorem prover, in which laws of concurrency 145 have been embedded. Laws of concurrency 145 are rules detailing equivalences between sets of processes combined in various ways, and/or relating process-based descriptions of systems or system components to equivalent sets of traces. The embedding may be "shallow" in which case the theorem prover operates on syntactic equivalences. The embedding may be "deep", in which case the theorem prover operates at the level of semantic equivalence. The latter is preferred, but the disclosed embodiments also may operate at a shallow level.

The embedding of laws of concurrency 145 in inference engine 150 may be validated by using the embedding to prove the laws of concurrency, which are known to be correct. An example of the laws of concurrency 145 are given in "Concurrent Systems: Formal Development in CSP" by M. G. Hinchey and S. A. Jarvis, McGraw-Hill International Series in Software Engineering, New York and London, 1995, herein incorporated by reference.

Laws of concurrency 145 may be expressed in any suitable language for describing concurrency. These languages include, but are not limited to, CSP (Communicating Sequential Processes), CCS (Calculus of Communicating Systems), and variants of these languages. The theorem prover forming the basis of inference engine 150 may be any available conventional commercial or academic theorem prover, or a bespoke theorem prover.

Inference engine 150 involves a deep embedding of the laws of concurrency expressed in CSP in the freely-available theorem prover ACL2. Other embeddings of laws of concurrency (or equivalence of combinations of processes) expressed in other languages and implemented in other theorem provers also embody the disclosures described herein, and may be substituted for inference engine 150 and are equivalent to the disclosed embodiments of the present invention.

Inference engine 150 takes as input trace specification 130, and combined with its embedding of the laws of concurrency 145, reverses the laws of concurrency 145 to infer a process-based specification 160. The process-based specification 160 is mathematically and provably equivalent to the trace-based specification 130. Mathematically equivalent does not necessarily mean mathematically equal. Mathematical equivalence of A and B means that A implies B and B implies A. Note that applying the laws of concurrency 145 to the process-based specification 160 would allow for the retrieval of a trace-based specification that is equivalent to the trace-based specification 130. Note that the process-based specification is mathematically equivalent to rather than necessarily equal to the original trace-based specification 130. This feature indicates the process may be reversed, allowing for reverse engineering of existing systems, or for iterative development of more complex systems.

The mechanism by which the inference engine 150 will infer the process-based specification 160 will vary depending on the theorem prover that is used as the basis of the inference engine 150. This feature generally involves a combination of rule rewriting and searching a tree of possible rewritings to determine which process combinations correspond to the traces in the trace-based specification 130. The choice of theorem prover used as the basis of the inference engine 160 will, combined with the completeness of the embedding of the laws of concurrency 145, determine the performance of the system.

Formal specification analyzer 170 receives as input the process-based formal specification 160. Formal specification analyzer 170 allows the user to manipulate the formal specification 160 in various ways. Alternate implementations, on different hardware and software architectures, may be considered. The formal specification analyzer 170 allows the user to examine the system described by the natural language scenarios 110, and to manipulate it so as to execute on a different combination of (local or distributed) processors. The process-based formal specification 160 may be analyzed to highlight undesirable behavior, such as race conditions, and equally important, to point out errors of omission in the original natural language scenarios 110 and/or the trace specification 130. The formal specification analyzer 170 is an optional but useful stage in the disclosed embodiments of the present invention. If the formal specification analyzer 170 is not used, then the process-based specification 160 and the revised formal specification 175 are identical. Hence, if the formal specification analyzer 170 is not used then all references to the revised formal specification 175 disclosed below also apply to the process-based specification 160.

Revised formal specification 175 highlights behavior patterns that were previously not considered possible, based on the description given in the natural language scenarios 110 and/or the trace-based specification 130. In reality, the behavior of the system is much more complex than considered in the natural language scenarios 110 and/or the trace specification 130 due to interactions between components, which users (and often developers) do not consider. As a result, other behavior patterns prove to be possible and revised formal specification 175 is easier to examine and highlights error conditions to be addressed.

Revised Formal specification 175 allows model checking that is performed to detect omissions and race conditions. Revised Formal specification 175 also allows verification of the requirements established by natural language scenarios 110. Revised formal specification 175 provides for the formal analysis of interactions between processes and the proofs of properties, such as the presence or absence of livelock or deadlock. A deadlock condition is defined as one where nothing happens after an action is taken. A livelock condition is defined as one where unpredictable results occur after an action. These conditions can be fatal in the software development process. Many other behaviors, such as avoidance of particular conditions, or recovery from particular conditions, can also be proven.

Formal specification converter 180 is a converter for formal specification 175. Formal specification converter 180 takes the higher level formal specification 170 and converts it to a lower-level specification 185 (possibly written in a different formal specification language or notation) that is suitable for input into a code generator 190. Preferably, low level specification 185 is in the B specification language, or some other specification language or notation. Further, code generator 190, preferably, is (part of) a B specification language toolkit. Code generator 190 generates code 195.

Code 195 preferably comprises a sequence of instructions to be executed as a software system. Code 195 is an accurate description of the system defined by natural language scenarios 110 that is mathematically provable. Code 195 is used for verification 196 of the natural language scenarios 110 as well as trace specification 130. Further, code 195 may be used as a basis for model checking 197. Code 195 comprises executable computer code, which may be translated before execution. Translator 200 receives code 195. Translator 200 is a compiler, interpreter, translator, transformer, and the like that generates instructions at a low level, such as machine code.

Either at the point of generating code 195, or ideally at the time of generating a revised formal specification 175, errors and problems are likely to arise, especially during the first iteration, as in all development situations. Incompatible scenarios are likely to raise the need for adjustments, improvements, and corrections. Natural language scenarios 110 may have to be corrected or changed. In these instances, software development system 100 allows for the modification of (or accepts the user's modifications to) the natural language scenarios 110 and re-executes the actions disclosed above. Moreover, if the requirements change, natural language scenarios 110 may be modified accordingly. Thus, natural language scenarios 110 are adaptable. Advanced users may wish to make amendments at the level of the traces specification 130 or the process-based specification 160 or even at the level of the revised formal specification 175. This action is permitted, but means that changes only take effect from that point on, and the mathematically provable equivalence to the natural language scenarios 110 is not maintained.

According to the disclosed embodiments of the present invention, software development system 100 provides mathematical traceability in that it allows for mathematical logic to demonstrate what was produced as code 195 matches what was defined by natural language scenarios 110. Thus, code 195 is provably correct with respect to natural language scenarios 110. Further, executable code 195 may be mechanically regenerated when requirements dictate a change in the high level specifications. Any change in the system defined by natural language scenarios 110 introduces the risk of new errors that necessitate re-testing and re-validation. This risk is reduced according to the disclosed embodiments.

The use of natural language scenarios 110 is effective in specifying a wide range of types of software. Automating the translation from natural language scenarios 110 to formal specification 185 reduces the need for testing yet produces high quality software systems. The need for testing is important, especially in those classes of systems where all possible execution paths cannot be tested. Any reduction in this need is desirable. The benefits of formal specification and development provide assurance that the software is operating correctly. Due to the high assurance techniques the amount of testing is reduced and less time is spent on coding and developing test cases. The result is reduced development time, higher quality systems, and less expense.

The disclosed embodiments provide for full automatic code generation that is efficient, that reduces the opportunity for programming errors, and that supports the whole system development life cycle. The disclosed embodiments also fit with existing processes. Specifically, through formal methods, the disclosed embodiments augment an informal case-based approach based on scenarios, thus bringing the benefits of correctness, precision, concision, accuracy, proof, and automatic code generation. The disclosed embodiments accept scenario-level specifications as input and convert them into a mathematics-based formal specification language. From the formal specification language, model checking and proofs of correctness are undertaken.

Once the specification is checked and corrections are made (involving a re-iteration of the development described above), the formal specification is converted into executable computer code. The formal specification provides means to check the scenarios for potential errors that would be difficult or nearly impossible to detect if those specifications had no underlying formal mathematical foundation. Thus, an end-to-end tool is provided that allows the creation of the high level specification for a software, or other, system, the conversion into a formal specification language, a verification of the formal specification for errors, and the production of executable computer code correctly representing the original high level specification. Thus, the disclosed invention realizes the long-sought goal in computer science of a tractable, automated means to obtain executable code that is provably equivalent to the application requirements (that is, the high level specification of the application).

In resolving conflicts between the behaviors described in natural language scenarios 110, an acceptable set of behaviors is determined and used in deriving the requirements specification of the system. Natural language scenarios 110 are expressed stating the actions that the system performs in response to various stimuli, external or internal. The actions and stimuli are chosen from a dictionary (representing the application domain context) of previously determined parameters for given processes and the proposed system.

In formal methods, a trace is the sequence of the events that a process is engaged in up to any given point in time. The set of traces of a process represents the set of all possible behavior patterns of that process. In many cases, the set of traces is an infinite set of finite sequences of events. The set of traces of a system is calculated from the sets of traces of its constituent processes, using the rules of a suitable formal specification language. In essence, a scenario is a constrained natural language description of some subset of the set of traces of the system.

Moreover, the use of the trace semantics is highly tractable. It is not necessary, however, to be able to list all of the traces of the system. Rather, the set of traces is given in intention; that is, a formula for calculating the set of traces is given, and manipulated, again using rules given in the formal specification language. Given a sequence of events, it is possible to determine whether it denotes acceptable execution of the system by determining whether or not it is a valid member of the set of traces of that system.

Therefore, from natural language scenarios 110, using a dictionary of events and actions written in a constrained way embodying domain parameters 115, it is possible to go to trace specification 130 of the system behavior. The disclosed embodiments then devise a mechanism for extracting a more useful process-based formal specification from trace specification 130.

Figure 2:
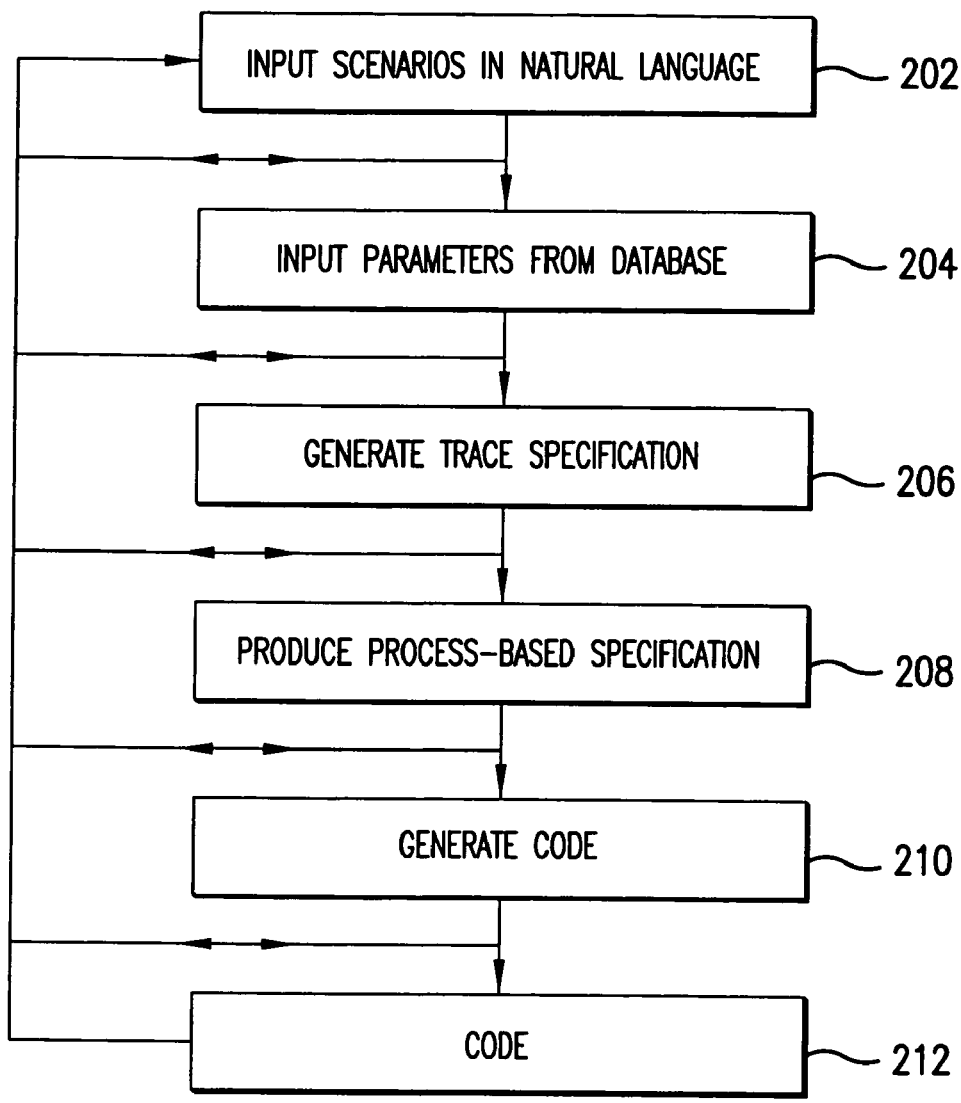
FIG. 2 illustrates a flowchart for deriving formal specifications and code from scenarios according to the disclosed embodiments.

FIG. 2 is a flowchart for deriving formal specifications and code from scenarios according to the disclosed embodiments. FIG. 1, however, is not limited by the embodiments disclosed by FIG. 2.

Step 202 executes by inputting scenarios written according to proposed system natural language text. Example 1 of the disclosed embodiments below, is a natural language scenario for a software system of an autonomous, agent-based ground system for satellite control.

EXAMPLE 1 OF THE DISCLOSED EMBODIMENTS

If the Spacecraft Monitoring Agent receives a "fault" advisory from the spacecraft
The agent sends the fault to the Fault Resolution Agent
OR
If the Spacecraft Monitoring Agent receives engineering data from the spacecraft
The agent will send the data to the Trending Agent
The software system uses agents as surrogates for human spacecraft controllers. In Example 1, the natural language scenario specifies that, when the agent receives a spacecraft fault, it will then send it on to a fault resolution agent that will analyze it for possible actions to take. The natural language scenario also states that if the agent receives engineering data from the spacecraft, it will send it to a trending agent.

Step 204 executes by inputting domain parameters from a database. The database of parameters includes domain specific terms to help define the scenarios. Such databases are developed for specific domains and inputted into the software development process, such as software development system 100 of FIG. 1.

Step 206 executes by generating traces for the natural language scenarios. Example 2 of the disclosed embodiments below discloses the equivalent structured text of a trace that the natural language scenario disclosed in Example 1 would be converted into.

EXAMPLE 2 OF THE DISCLOSED EMBODIMENTS inSCMA?fault from Spacecraft
then outSCMA! to FRA
else
inengSCMA!data from Spacecraft
then outengSCMA!data to TREND
Example 3 of the disclosed embodiments below discloses the traces of the specification derived from the structured text.

EXAMPLE 3 OF THE DISCLOSED EMBODIMENTS 1. tSCMA $\supseteq$ {<>, <inSCMAfault, outSCMAfault>}
2. +{<>,<inengSCMAdata><inengSCMAdata, outSCMAdata>}

Step 208 executes by producing the process-based formal specification from the traces. Example 4 of the disclosed embodiments discloses the formal specification produced from the traces. Also, following Step 208, error checking and trouble-shooting may occur.

EXAMPLE 4 OF THE DISCLOSED EMBODIMENTS

SCMA=in SCMA?fault→(outSCMA!fault→STOP)
|(inengSCMA?data→outengSCMA!data→STOP)
Step 210 executes by generating code from the lower level specification. The derived code is executable computer code that is a sequence of instructions in a suitable notation for execution within a software system. The generated code includes commands for the domain specified earlier. The derived code is an accurate description of the desired software system that exactly and mathematically provably corresponds to the natural language scenarios given as input in step 202. Step 212 executes by translating the code into machine code or other low level instructions for use in the subject satellite system.

The flowchart of FIG. 2 allows for verification and validation between Step 202 and Step 212. As indicated on the flowchart, the disclosed process may be repeated at any time to correct mistakes, change requirements, and the like. In other words, at any step in the disclosed process, the disclosed embodiments may repeat a step or a series of steps, or may be interrupted by the user, if an error is found, or if the user wishes simply to repeat the step, or steps, or to make a change that may not represent an error but rather a desired change or enhancement. Further, the process may be revisited at a later time to modify the software requirements or specifications. Thus, the disclosed embodiments provide flexibility over conventional systems by allowing testing and validation to occur, and to easily modify the system.

Further, according to the disclosed embodiments of the present invention, the disclosure of FIG. 2 allows for the reverse process to be implemented. In other words, generated code may be "reverse engineered" to derive formal specifications, which may be analyzed more easily and often may be understood more easily. This approach may even be used to derive traces and natural language scenarios as a means of explaining (or paraphrasing) the operation of existing systems. This feature is desirable for legacy systems or those systems where the original specifications or requirements are not available. Once the natural language scenarios are derived, they can be modified to update, correct, or change the requirements of the software system. Further, the disclosed embodiments are not just applicable to software systems. The disclosed embodiments are applicable to any system, device, or process that uses instructions to perform an action. For example, the disclosed embodiments are applicable to systems that describe or generate instructions for systems that result in the manufacture of products or items.

It will be apparent to those skilled in the art that various modifications and variations can be made in the present invention without departing form the spirit or scope of the invention. Thus, it is intended that the present invention covers the modifications and variations of this invention provided that they come within the scope of any claims and their equivalents.

What is claimed is:

1. A method for deriving a process-based specification for a system, comprising:
    deriving a trace-based specification from a non-empty set of traces by a processor, wherein a trace is a sequence of actions expressed as strings representing a history of an execution of a process;
    mathematically inferring the process-based specification from the trace-based specification, wherein mathematically inferring includes applying Laws of Concurrency in reverse to a set of system traces to determine the process-based specification, wherein the process-based specification is mathematically equivalent to the trace-based specification, and whereby the Laws of Concurrency are algebraic laws that (a) allow at least one process to be manipulated and analyzed, (b) permit formal reasoning about equivalences between processes, and (c) determine traces from the at least one process;
    generating the process-based specification using an inference engine, wherein the inference engine iteratively applies a set of rules to a set of data representing a problem to determine a solution to the problem by logical manipulation and analysis of the set of data; and
    analyzing the process-based specification to examine possible implementations of the process-based specification in different configurations, whereby analyzing includes identifying at least one equivalent alternative process-based specification and characterizing differences between the process-based specification and the at least one alternative process-based specification, wherein differences include number of processes, deterministic behavior, and competition for resources.

2. The method of claim 1, wherein the process-based specification is provably equivalent to the trace-based specification.

3. The method of claim 1, wherein the Laws of Concurrency are used by the inference engine to generate the process-based specification.

4. The method of claim 3, wherein the laws of concurrency are reversed by embedding the Laws of Concurrency in the inference engine.

5. The method of claim 4, wherein the embedding is syntactic or shallow.

6. The method of claim 4, wherein the embedding is semantic or deep.

7. The method of claim 3, wherein the Laws of Concurrency are reversed so that an equivalent process expression is output in response to a given input of at least one trace.

8. The method of claim 7, wherein multiple process expressions are given as output in response to inputs of the at least one trace.

9. The method of claim 1, wherein the various possible implementations of the process-based specification are based on transformations of the process-based specification by applying the Law of Concurrency to derive various implementations.

10. The method of claim 9, wherein the various equivalent implementations are mathematically equivalent to the process-based specification.

11. The method of claim 10, wherein the various equivalent implementations are provable equivalent to the process-based specification.

12. The method of claim 11, wherein multiple correct process-based specifications are possible.

13. The method of claim 12, further comprising:
    deciding which of the multiple correct process-based specifications are most appropriate.

14. The method of claim 13, wherein the process-based specification is used as a basis for generation of alternate representations.

15. The method of claim 14, wherein the alternate representations are sets of instructions.

16. The method of claim 1, wherein the set of traces is a set of sequences of events or activities specific to an application domain.

17. The method of claim 1, wherein the set of traces is derived by pre-processing a set of scenarios given as input by a user to a context sensitive editor.

18. The method of claim 17, wherein the set of scenarios is natural language text describing intended system behavior, and the elements of the set of traces are sequences of events or activities in a given application domain.

19. The method of claim 18, wherein the set of scenarios is represented by various graphical notations.

20. The method of claim 1, wherein the deriving step is repeated.

21. The method of claim 1, wherein the inferring step is repeated.

22. The method of claim 1, further comprising:
reverse engineering an existing system using the deriving step and the inferring step, whereby reverse engineering includes analyzing a process-based specification and applying the Laws of Concurrency using an inference engine having domain knowledge to infer a set of traces equivalent to the process-based specification and to derive a set of scenarios for the system equivalent to the process-based specification, wherein the scenarios are natural language text that describes the system's actions in response to incoming data and the internal goals of the system.

23. The method of claim 1, further comprising:
reverse engineering an existing system back to a set of traces using the deriving step and the inferring step, whereby reverse engineering includes analyzing a process-based specification and applying the Laws of Concurrency using an inference engine having domain knowledge to infer a set of traces equivalent to the process-based specification and to derive a set of scenarios for the system equivalent to the process-based specification, wherein the scenarios are natural language text that describes the system's actions in response to incoming data and the internal goals of the system.

24. a system adapted for deriving a process-based specification, comprising:
at least one natural language scenario;
a computer-readable medium having instructions stored thereon for deriving a trace-based specification from the at least one natural language scenario;
an inference engine for mathematically inferring the process-based specification from the trace-based specification, wherein mathematically inferring includes applying Laws of Concurrency in reverse to a set of system traces to determine the process-based specification, wherein the process-based specification is mathematically equivalent to the trace-based specification, and whereby the Laws of Concurrency are algebraic laws that (a) allow at least one process to be manipulated and analyzed, (b) permit formal reasoning about equivalences between processes, and (c) determine traces from the at least one process;
a generating engine for generating the process-based specification using an inference engine, wherein the inference engine iteratively applies a set of rules to a set of data representing a problem to determine a solution to the problem by logical manipulation and analysis of the set of data; and
an analyzing engine for analyzing the process-based specification to examine possible implementations of the process-based specification in different configurations, whereby analyzing includes identifying at least one equivalent alternative process-based specification and characterizing differences between the process-based specification and the at least one alternative process-based specification, wherein differences include number of processes, deterministic behavior, and competition for resources.

25. A system adapted for deriving a process-based specification, comprising:
a non-empty set of traces;
a computer-readable medium having instructions stored thereon for deriving a trace-based specification from the set of traces, wherein a trace is a sequence of actions expressed as strings representing a history of an execution of a process;
an inference engine for mathematically inferring the process-based specification from the trace-based specification, wherein mathematically inferring includes applying Laws of Concurrency in reverse to a set of system traces to determine the process-based specification, wherein the process-based specification is mathematically equivalent to the trace-based specification, and whereby the Laws of Concurrency are algebraic laws that (a) allow at least one process to be manipulated and analyzed, (b) permit formal reasoning about equivalences between processes, and (c) determine traces from the at least one process;
a generating engine for generating the process-based specification using an inference engine, wherein the inference engine iteratively applies a set of rules to a set of data representing a problem to determine a solution to the problem by logical manipulation and analysis of the set of data; and
an analyzing engine for analyzing the process-based specification to examine possible implementations of the process-based specification in different configurations, whereby analyzing includes identifying at least one equivalent alternative process-based specification and characterizing differences between the process-based specification and the at least one alternative process-based specification, wherein differences include number of processes, deterministic behavior, and competition for resources.

26. A method for deriving a process-based specification for a system, wherein the system performs actions, comprising:
receiving at least one natural language scenario describing the actions;
generating a trace-based specification from the at least one natural language scenario by a processor;
mathematically inferring the process-based specification from the trace-based specification, wherein mathematically inferring includes applying Laws of Concurrency in reverse to a set of system traces to determine the process-based specification, wherein the process-based specification is mathematically equivalent to the actions defined above, whereby the Laws of Concurrency are algebraic laws that (a) allow at least one process to be manipulated and analyzed, (b) permit formal reasoning about equivalences between processes, and (c) determine traces from the at least one process;
generating the process-based specification using an inference engine, wherein the inference engine iteratively applies a set of rules to a set of data representing a problem to determine a solution to the problem by logical manipulation and analysis of the set of data; and
analyzing the process-based specification to examine possible implementations of the process-based specification in different configurations, whereby analyzing includes identifying at least one equivalent alternative process-based specification and characterizing differences between the process-based specification and the at least one alternative process-based specification, wherein differences include number of processes, deterministic behavior, and competition for resources.

* * * * *